Oct. 1, 1946.　　F. A. GESSLER　　2,408,390
TEAT CUP FOR MILKING MACHINES
Filed Dec. 29, 1944
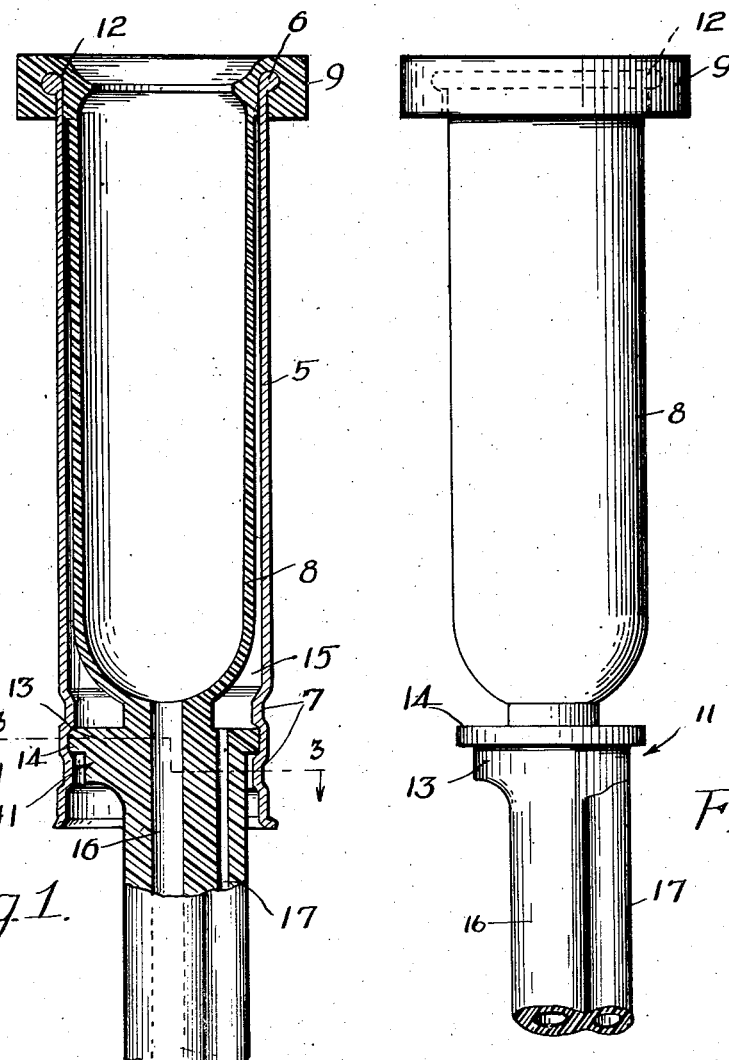
INVENTOR
FREDERICK A. GESSLER Patented Oct. 1, 1946

2,408,390

UNITED STATES PATENT OFFICE 2,408,390

TEAT CUP FOR MILKING MACHINES

Frederick A. Gessler, Des Moines, Iowa, assignor, by mesne assignments, to Globe Milker, Inc., Des Moines, Iowa, a corporation of Illinois Application December 29, 1944, Serial No. 570,436

4 Claims. (Cl. 31—85)

This invention relates generally to teat cups for mechanical milking machines and in particular to a teat cup of the type including a casing or a housing with an inflation supported in a spaced relation within the casing.

An object of this invention is to provide an improved teat cup for mechanical milking machines.

A further object of this invention is to provide a two piece teat cup for a pulsation type milking machine comprised of a casing and an associated rubber liner integrally formed with a milk tube and a pulsation tube, in which the casing and liner are of a simple and inexpensive design, and relatively constructed to be quickly and easily assembled and taken apart.

Further objects, features and advantages of this invention will become apparent from the following description when taken in connection with the accompanying drawing in which:

Fig. 1 is an elevational view of the teat cup of this invention showing the casing and substantially all of the liner in section;

Fig. 2 is an elevational view of the liner; and

Fig. 3 is a sectional view taken along the line 3—3 in Fig. 1.

With reference to the drawing the teat cup of this invention is shown in Figs. 1 and 2 as comprising a metal tubular casing or teat cup shell 5, of a cylindrical shape, integrally formed with an outside peripheral bead 6 at its upper end, and a series of inside axially spaced pressed-in annular ridges 7 adjacent its lower end. It is thus seen that the inside diameter of the tubular casing 5 is the same throughout its length except for the inwardly projected ridges 7 at its lower end.

The liner for the teat cup is composed of a flexible material such as rubber or the like and is integrally constructed with an inflation 8 having an enlarged head portion 9 at its upper end and a base member, indicated generally as 11, adjacent its lower end. The head portion 9 is formed with an undercut annular recess 12 adapted to receive the bead 6 in fluid tight engagement.

The base 11 includes an annular body member 13 having an annular projection or flange 14 at its upper end, and merging at its lower end into a milk tube 16 and a pulsation tube 17, which are connected together in a side by side relation. The pulsation tube 17 extends through and is open to the top side of the body member 13, which top side defines the bottom of an air chamber 15, while the milk tube extends through the body member 13 for fluid communication with the lower end of the inflation 8. As best appears in Figs. 1 and 3 the flange 14 is of a diameter substantially equal to the inside diameter of the tubular casing 5 for a purpose which will appear later.

In the assembly of the teat cup, the milk tube 16 and pulsation tube 17 are inserted into the upper end of the tubular casing 5 and then pulled outwardly from the lower end of the casing to position the inflation 8 in a spaced relation within the casing to form the air chamber 15. This pulling action initially seats the peripheral bead 6, at the upper end of the casing 5, within the undercut recess 12. As the pulling action is continued the inflation 8 is extended or stretched downwardly until the peripheral edge of the flange 14 is in abutting engagement, with the under side of a ridge 7. The inflation 8 is thus fluid sealed at its upper end with the casing 5 by the engagement of the bead 6 within the recess 12 and at its lower end by the engagement of the flange 14 with a ridge 7.

When the liner is new a fluid seal of the lower end of the inflation 8 is accomplished with the upper one of the ridges 7. In use some of the stretch in the inflation 8 is lost and at such time it is necessary to stretch the inflation 8 to engage the flange 14 with the lower one of the ridges 7. After the stretch in the inflation 8 is lost so that a fluid seal is not obtainable at its lower end with any of the ridges 7, the original liner is replaced with a new one. As is clearly illustrated in Figs. 1 and 2 that portion of the body member 13, below the flange 14, is of a slightly reduced diameter relative to the flange 14, and acts to support and reinforce the flange 14, in an operative position with a ridge 7, against undesirable distortion and axial flexing movement.

In the operation of the teat cup the milk tube 16 is connected with a closed milk receptacle (not shown), which is generally under a partial vacuum. The pulsation tube 17 is connected with a pulsator (not shown) generally included as a part of the milking machine. A cow's teat is insertable within the inflation 8 at its upper end. The air chamber 15, between the inflation 8 and the casing 5, is then alternately placed under atmospheric and sub-atmospheric pressure by the action of the pulsator, whereby the inflation 8 is in turn alternately squeezed and then released from a cow's teat, with the pressures being applied to the chamber 15 through the pulsation tube 17, and the milk withdrawn being carried from the inflation 8 through the milk tube 16.

Although the invention has been described with respect to a preferred embodiment thereof it is to be understood that it is not to be so limited since changes and modifications can be made therein which are within the full intended scope of this invention as defined by the appended claims.

I claim:

1. In a teat cup, the combination with a tubular casing of cylindrical shape having a peripheral bead at on end, and axially spaced, inwardly extended annular ridges adjacent its opposite end, of an integrally formed flexible liner having an enlarged head portion with an annular undercut recess adapted to receive said peripheral bead, and including a base member comprised of a milk tube, a pulsation tube and an annular projection, said projection comprising two portions of different thicknesses transversely of the liner, with the portion of greater thickness having a diameter substantially equal to the inner diameter of said casing so that the peripheral edges thereof is adapted to abut against one of said annular ridges, and the portion of lesser thickness constituting a reinforcing structure to prevent undesirable distortion of the projection when in operative position with one of said ridges, with said two tubes being terminated substantially at said projection and extended therethrough.

2. In a teat cup of the type described comprising a tubular outer casing and an inner flexible liner wherein the liner is maintained in operative position relative to the casing by friction means, said friction means comprising parallel beads on the casing, and at least one bead on the liner, said one bead having adjacent thereto reinforcing structure to support the bead, when in operative position within the casing, from being materially distorted, the bead having closely adjacent thereto and the reinforcing structure having therein a passageway from fluid other than milk.

3. In a teat cup of the type described comprising a tubular outer casing and an inner flexible liner wherein the liner is maintained in operative position within the casing by friction means, said friction means comprising a series of parallel beads on said casing and an annular projection on said liner comprising two portions of different thicknesses transversely of the liner, with the portion of greater thickness having its peripheral edge adapted to frictionally engage one of said beads, and the portion of lesser thickness constituting a reinforcing structure to prevent undesirable distortion of the projection when in said frictionally engaged position, said projection having therein a passageway for fluid other than milk.

4. In a teat cup of the type described comprising a tubular outer casing of a straight cylindrical shape having the openings a the opposite ends thereof of substantially the same size, and an inner flexible liner which is maintained in operative position relative to the casing by friction means, said friction means comprising a series of parallel beads on said casing adjacent one end thereof, an annular projection on the liner having a diameter substantially equal to the inner diameter of said casing, and a peripheral portion on said projection adapted to frictionally engage a side surface of one of said beads to hold the liner in operative position within the casing.

FREDERICK A. GESSLER.